US006634693B2

(12) United States Patent
Straesser, Jr.

(10) Patent No.: US 6,634,693 B2
(45) Date of Patent: Oct. 21, 2003

(54) AUTOMOBILE INSTRUMENT PANEL ASSEMBLY

(75) Inventor: Britta Straesser, Jr., Siegburg (DE)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/062,107

(22) Filed: Jan. 31, 2002

(65) Prior Publication Data

US 2003/0141738 A1 Jul. 31, 2003

(51) Int. Cl.[7] .............................................. B62D 25/14
(52) U.S. Cl. ........................ 296/70; 248/27.1; 180/90; 24/297; 24/453
(58) Field of Search ..................... 296/70, 29, 191, 296/203.02, 37.8, 37.12; 24/297, 453; 180/90; 248/27.1, 27.3

(56) References Cited

U.S. PATENT DOCUMENTS

| 3,799,483 | A | * | 3/1974 | Chiappinelli | ............... 248/27.1 |
| 4,169,624 | A | * | 10/1979 | Yefsky et al. | ............ 296/37.12 |
| 4,309,012 | A | * | 1/1982 | Fukunaga | .................. 248/27.1 |
| 4,350,383 | A | | 9/1982 | Kikuta | |
| 4,559,868 | A | | 12/1985 | Nonaka et al. | |
| 4,911,386 | A | * | 3/1990 | Putman et al. | ............. 248/27.1 |
| 4,920,799 | A | * | 5/1990 | Low | ........................... 248/27.1 |
| 5,104,071 | A | * | 4/1992 | Kowalski | ................... 248/27.1 |
| 5,259,655 | A | * | 11/1993 | Anderson | ..................... 296/70 |
| 5,294,164 | A | | 3/1994 | Shimabara et al. | |
| 5,324,203 | A | * | 6/1994 | Sano et al. | .................... 296/70 |
| 5,364,159 | A | | 11/1994 | Kelman et al. | |
| 5,467,947 | A | * | 11/1995 | Quilling, II | ................. 248/27.1 |
| 5,479,693 | A | * | 1/1996 | Oyama | ......................... 180/90 |
| 5,507,610 | A | | 4/1996 | Benedetti et al. | |
| 5,779,197 | A | * | 7/1998 | Kim | .......................... 248/27.1 |
| 5,806,916 | A | | 9/1998 | Sinner et al. | |
| 5,810,418 | A | | 9/1998 | Stenger et al. | |
| 5,813,693 | A | * | 9/1998 | Gordon et al. | ................. 24/297 |
| 5,883,777 | A | * | 3/1999 | Nishitani et al. | ............. 296/70 |
| 5,927,790 | A | | 7/1999 | Futschik et al. | |
| 5,934,733 | A | | 8/1999 | Manwaring | |
| 5,951,087 | A | | 9/1999 | Bittinger et al. | |
| 5,979,965 | A | | 11/1999 | Nishijima et al. | |
| 6,073,987 | A | | 6/2000 | Lindberg et al. | |
| 6,095,272 | A | * | 8/2000 | Takiguchi et al. | ............ 180/90 |
| 6,095,595 | A | | 8/2000 | Galbraith | |
| 6,132,154 | A | | 10/2000 | Easter | |
| 6,176,534 | B1 | * | 1/2001 | Duncan | ....................... 296/70 |
| 6,388,881 | B2 | * | 5/2002 | Yamauchi et al. | ............ 296/70 |
| 6,481,682 | B2 | * | 11/2002 | Miura | ..................... 248/231.9 |
| 6,484,370 | B2 | * | 11/2002 | Kanie et al. | .................. 24/297 |

* cited by examiner

Primary Examiner—D. Glenn Dayoan
Assistant Examiner—Greg Blankenship
(74) Attorney, Agent, or Firm—Brinks Hofer Gilson & Lione

(57) ABSTRACT

The present invention provides an apparatus and method of assembly for securely attaching an instrument panel to an automobile. In one embodiment of the invention, a housing containing electronic components for the instrument panel is attached to the frame structure of an automobile. The bezel panel containing the control and display areas is then attached to the housing. The cover panel is then attached to the bezel panel and the housing by fasteners extending through the bezel panel.

20 Claims, 3 Drawing Sheets

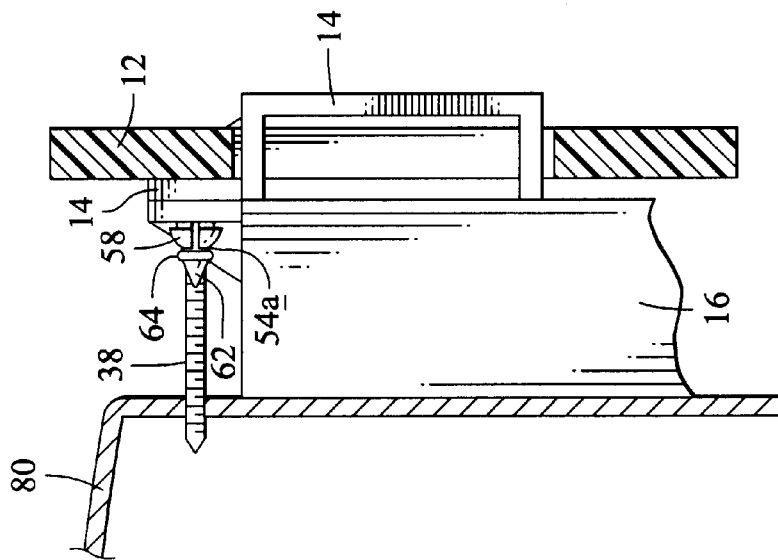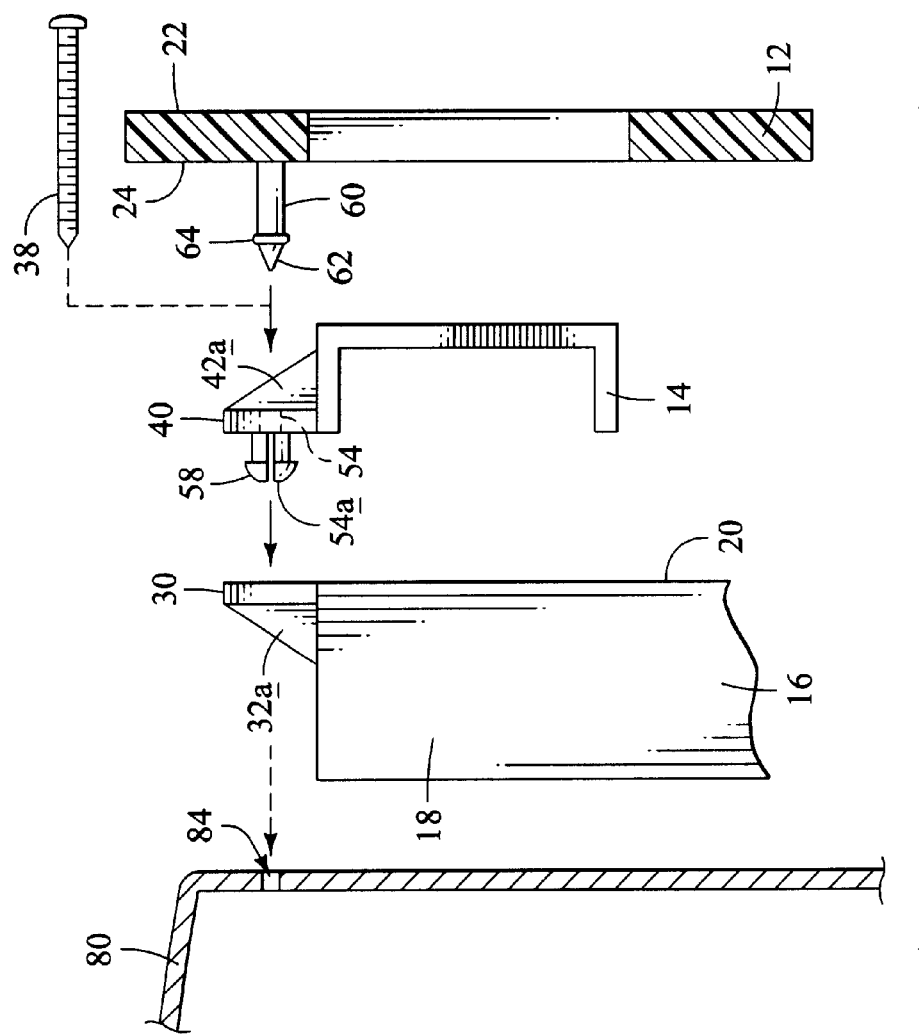

AUTOMOBILE INSTRUMENT PANEL ASSEMBLY

FIELD OF THE INVENTION

This invention relates generally to the field of automobile instrument panel assembly, in particular instrument panels having structural components interconnected to each other.

BACKGROUND OF THE INVENTION

Instrument panels are located in the cockpit of automobiles and are often the command center allowing for the driver to monitor and control the workings of the automobile. As such, the fixing of the instrument panel and its components to the rest of the car is crucial. An instrument panel should be securely fastened to the body of the automobile and minimize rattling and improper alignment. There are three major components of an instrument panel including the housing that contains electrical components, the bezel panel containing the dials, displays, knobs, and buttons commonly thought of as the controls, and a cover panel overlying the controls and integrating the instrument panel into the automobile and sometimes referred to as trim.

Previous instrument panel assemblies include the housing affixed to the automobile and the bezel panel rigidly affixed to the housing. The cover panel is then brought over and around the joined housing and bezel panel and itself affixed to the automobile, such as at to a frame, cowl or cross-beam. Such construction, however, can result in gaps between the bezel panel and the cover panel creating rattling as the panel and cover move independently of one another due to standard automobile vibrations. Such gaps may perhaps even obscure the view of the periphery of the bezel panel. Such inferior construction can cause noise and is not visually pleasing to the passengers.

As such, it is an object of this invention is to decrease gaps between the bezel panel and the cover panel when installed in an automobile. A further object of the invention is to reduce instrument panel vibration and rattling noise caused by the movement and contact of the bezel panel with the cover panel.

BRIEF SUMMARY OF THE INVENTION

The present invention provides an apparatus and method of assembly for securely attaching an instrument panel to an automobile. In one embodiment of the invention, a housing containing electronic components for the instrument panel is attached to the frame structure of an automobile. The bezel panel containing the control and display areas is then attached to the housing. The cover panel is then attached to the bezel panel and the housing by fasteners extending through the bezel panel.

In a further embodiment of the invention, the housing and the cover panel are joined via the bezel panel. The bezel panel has bilateral fastening means, which align with the housing and the cover panel to allow for attachment of all three components together.

Another embodiment of the invention allows for lateral movement among the three components. This allows for movement of the components while retaining alignment of the instrument panel as a whole.

The invention may also be embodied in a method for assembling an automobile instrument panel. The method includes the steps of providing a housing and attaching a cover panel to the housing via a bezel panel having bilateral fastening means.

It is to be understood that both the preceding summary and the following detailed description are intended to be exemplary and explanatory and are intended to provide a further explanation of the invention claimed. The invention will be best understood by reference to the following detailed description read in conjunction with the accompanying drawings.

BRIEF DESCRIPTION OF SEVERAL VIEWS OF THE DRAWINGS

These and other advantages of the present invention will become more fully apparent as the following description is read in conjunction with the accompanying drawings, wherein:

FIG. 2 is a side view of the assembly of FIG. 1; and

FIG. 3 is a side view of the completed assembly of FIG. 2 in accordance with the present invention.

DETAILED DESCRIPTION OF THE INVENTION

Figure 1:
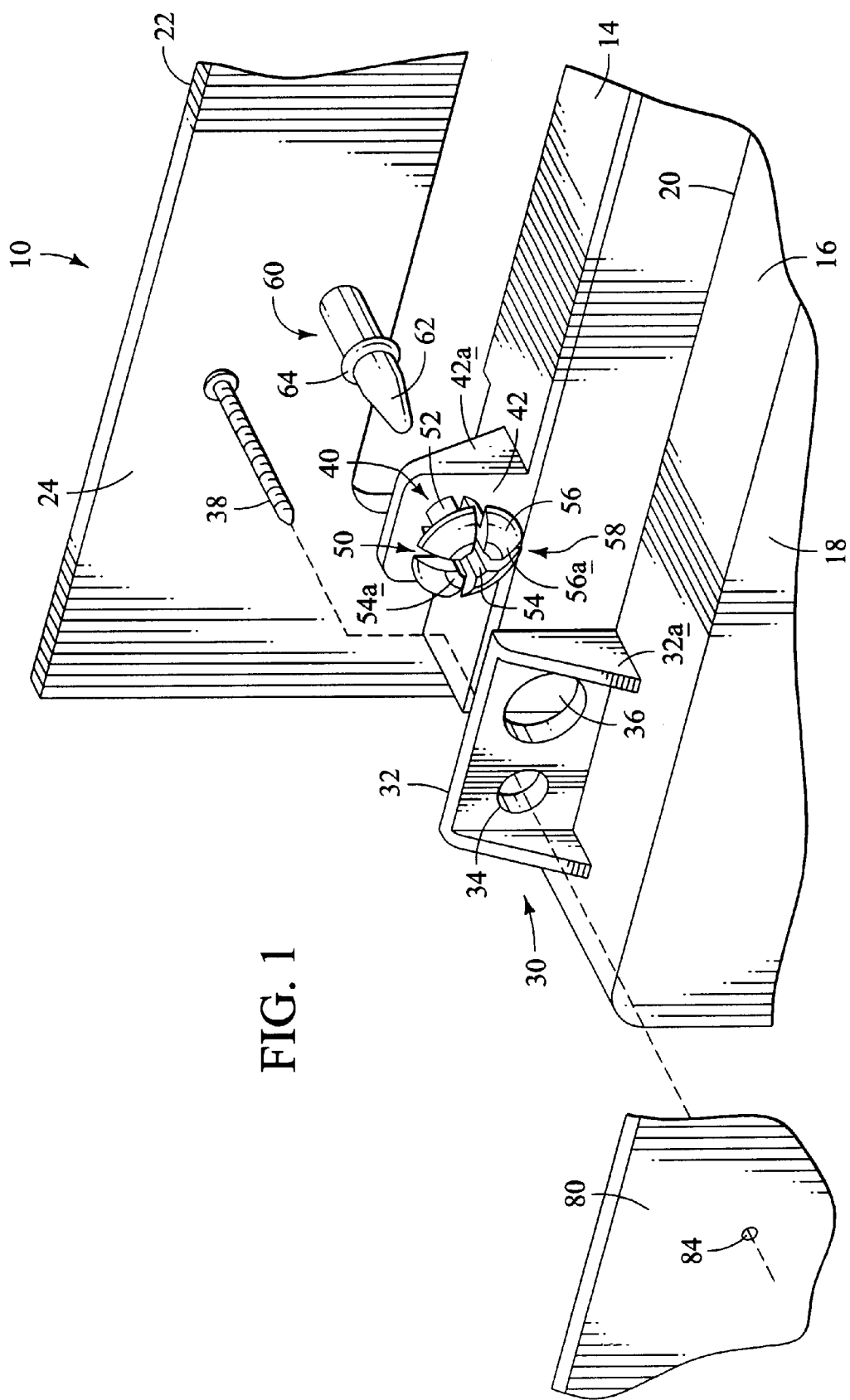
FIG. 1 is an exploded perspective view showing the main components of an instrument panel assembly in accordance with the present invention.

A first preferred embodiment of the instrument panel assembly in accordance with the present invention is shown in the exploded view of FIGS. 1 and 2. The instrument panel assembly unit 10 is preferably implemented as part of an automotive vehicle centerstack, which is a collection of occupant controls mounted to a portion of the central dashboard area of a vehicle interior. Typically, the centerstack is formed over a rack, which may comprise a stable mounting structure integrated into the automotive interior frame 80. Other mounting structures are possible and contemplated, as is well-known in the art.

The unit 10 preferably includes at least three interconnected components for mounting on the frame, namely a centerstack panel or an instrument panel cover 12, a bezel 14 and an instrument housing 16. In the preferred embodiment, the instrument housing 16 typically contains the electronics, circuitry and the bulk of the various control mechanisms that the operator uses to control various functions within the vehicle. For example, the instrument housing 16 may contain switch housings, potentiometers, printed circuit boards, digital readouts, liquid crystal displays membrane pushbutton contact boards, stereo componentry and other electronics. The housing preferably includes a component mounting recess 18 and a front face 20.

The outer periphery of the housing 16 preferably defines a plurality of upstanding flanges 30 spaced around the periphery. Each flange 30 may include a receiving wall 32 and a pair of side reinforcements 32a. Preferably the receiving wall 32 is aligned generally parallel to the front face 20 and the front of the instrument panel 22. Each of the flanges 30 preferably define a pair of apertures or openings 34 and 36 as shown, which are receiving means for fasteners described below. The housing 16 is preferably mounted to the frame 80 via fasteners or rivets 38 that extend through the opening 34 in each of the flanges 30 into the frame 80 at opening 84.

The bezel component 14 in the preferred embodiment is sandwiched between the panel cover 12 and the housing 16 as shown. The bezel 14 preferably comprises a clear resin or plastic member that is injection molded to conform to the shape of the rear surface of the instrument panel cover 12, the front face of the housing 16, or both. Preferably, the resin or plastic material of the bezel 14 has light-transmitting opaque or transparent qualities to allow digital displays or illuminating components in the housing to be viewed by the user though corresponding openings in the instrument panel cover 12. In some configurations, the bezel component 14 may be used to illuminate certain instrument panel components or a display board 82. The bezel 14 may also contain components such as registers, stereo components or controls.

The outer periphery of the bezel 14 preferably defines a plurality of upstanding bezel flanges 40 spaced around the periphery. Each flange 40 preferably comprises a flat wall 42 which may be aligned with the wall 32 of each flange 30 of the housing 16, and a pair of forwardly facing side reinforcements 42a. Preferably, the wall 42 is aligned generally parallel to the plane of the receiving wall 32 of the housing 16 and the front of the instrument panel 22.

In order to attach the bezel 14 to the housing 16 in a sufficiently secure fashion in accordance with the present invention, a bilateral connector 50 is defined on the rearwardly facing side of the flat wall 42 of the bezel flange 40. Preferably, the bilateral connector 50 projects rearwardly and is aligned with the opening 36 in the housing flange 30. Each bilateral connector preferably includes a plurality of projecting sections 52 arranged annularly around a receiving means or opening 54 defined in the bezel flange 40 to form a cylindrical member having axially aligned slits. In the preferred embodiment, four projecting sections 52 are implemented which define pie-shaped wedges in axial cross-section. The distal end of each projecting section 52 includes a flared portion 56. In the preferred embodiment, the flared portions 56 of each of the projection sections 52 combine to create an annular flared area 58 of the bilateral connector 50.

Each projection section 52 is preferably molded from plastic or resin material, and is deformable radially inwardly toward the center of the opening 54 and outwardly to allow the connector 50 to be inserted through the opening 36 in the housing flange 30. Once inserted, the bezel is held securely by the bilateral connector 50 within the opening 36, since the flared area 58 provides an annular securement to the flange 30 upon outward deformation of each projection section 52. Preferably, the front portions of each flared portion 56 includes a slightly domed nose portion 56a to facilitate insertion into the opening 36. Furthermore, it is preferred that the size of the opening 36 is slightly smaller than the diameter of the flared area 56 to allow for proper securement. The assembled connection is shown in FIG. 3.

The instrument panel cover 12 preferably includes a user side 22 and a rear side 24 that faces rearwardly toward the frame. The rear side 24 preferably defines a plurality of posts 60 projecting rearwardly to allow secure attachment of the panel cover 12 to the bezel 14. Each post 60 is preferably aligned with the opening 54 in the bezel flange 40, and includes a tapered nose portion 62 to facilitate insertion into the opening 54. A collar 64 extends radially from the outer wall of the post 60 to engage the periphery 54a of the front portion of the bilateral connector 50 and prevent withdrawal from the opening 54. The collar 64 may be a separate ringlike component that resides in an annular groove on each post 60, or it can be integrally molded thereto.

Figure 4:
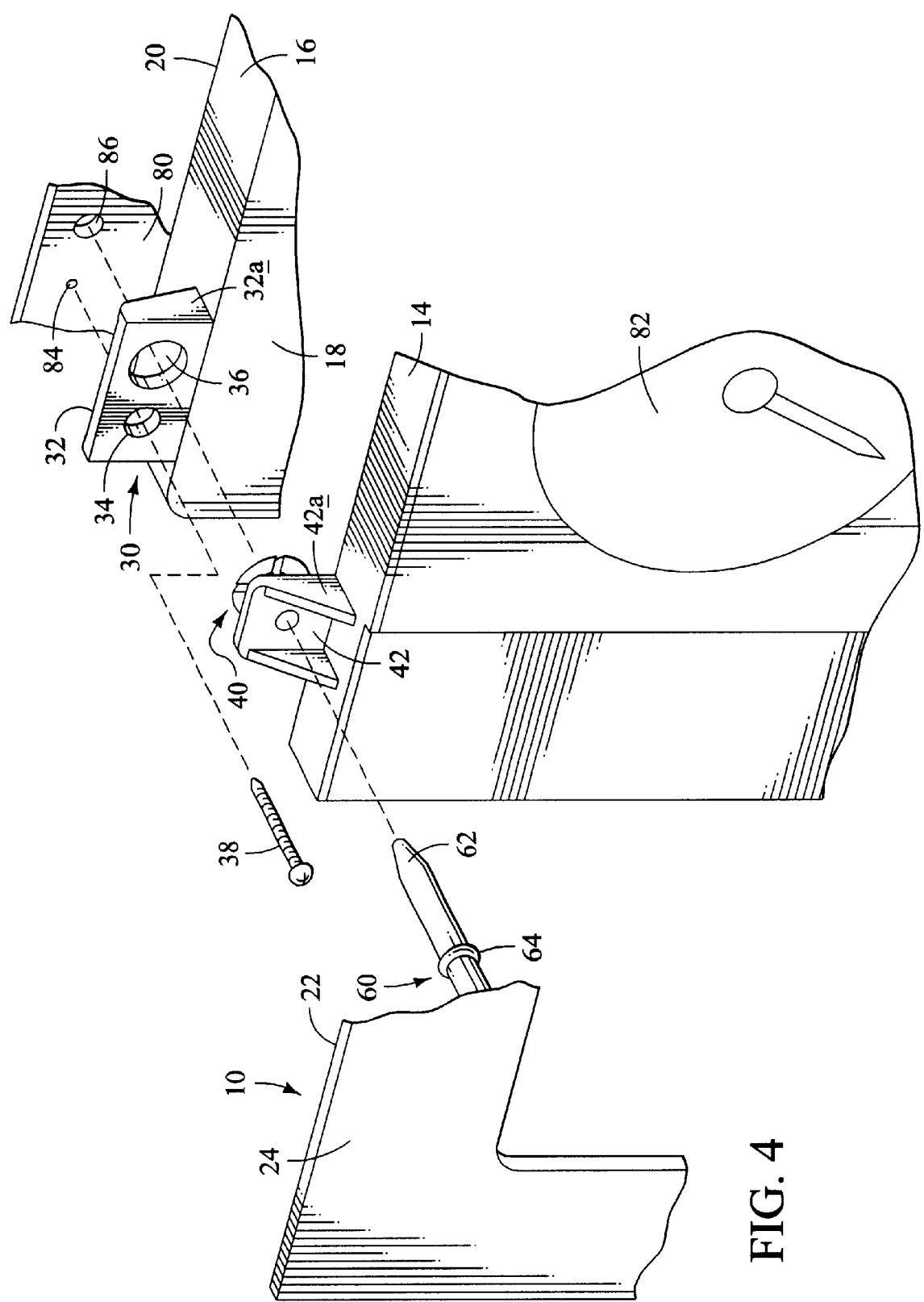
FIG. 4 is an exploded perspective view showing the main components the instrument panel assembly in an alternative embodiment.

In an alternative embodiment, the post 60 may include threads or other known fastening means, and may be long enough to be attached through both the bezel 14, the housing 16, and the frame 80 at opening 86, as shown in FIG. 4.

The present invention allows secure, simplified attachment of the housing, bezel and instrument cover, and allows these main components to move together. This prevents misalignment of the bezel with the other components during vibration or other common movements and flexing of the vehicle. Furthermore, aligned, accurate assembly of the instrument panel components to the centerstack frame is more easily accomplished.

While the invention has been described in connection with a specific embodiment thereof, it is evident that many alternatives, modifications and variations will be apparent to those skilled in the art in light of the foregoing description. For example, the post 60 and the receiving means could be reversed in position. The post 60 could be located on the housing and the receiving means located on the cover panel 12 and/or bezel 14. Accordingly, it is intended that the invention includes all such alternatives, modifications, and variations as fall within the spirit and broad scope of the appended claims.

I claim:

1. An automobile instrument panel assembly comprising:
   a frame structure of an automobile;
   a housing, containing electronic components, said housing being attached to said frame structure;
   a bezel panel containing a display board, said bezel panel being attached to said housing; and
   a cover panel attached to said bezel panel and said housing via fastening means on said bezel panel,
   wherein said housing, said bezel panel and said cover panel are interconnected and comprise an instrument panel unit, said unit being attached to said frame.

2. An automobile instrument panel assembly according to claim 1 wherein said cover panel is additionally attached directly to said frame structure.

3. An automobile instrument panel assembly according to claim 1 wherein said bezel panel and said cover panel are removably attached to one another and said housing.

4. An instrument panel assembly comprising:
   a housing;
   a cover panel joined to said housing via a bezel panel, said bezel panel having a first side and a second side, said bezel panel including bilateral fastening means for fastening said cover panel to one of said first side and said second side, and said other side of said bezel to said housing.

5. An automobile instrument panel assembly according to claim 4 wherein said housing defines a plurality of receiving means.

6. An automobile instrument panel assembly according to claim 4 wherein said housing includes a housing flange positioned parallel to said cover panel.

7. An automobile instrument panel assembly according to claim 6 wherein said flange includes receiving means for engagement of said bilateral fastening means.

8. An automobile instrument panel assembly according to claim 5 wherein said receiving means further comprises an aperture.

9. An automobile instrument panel assembly according to claim 4 wherein said bilateral fastening means comprises a generally cylindrical hollow body having a first end and a second end; said first end extending through said housing flange and terminating flush with said first side of said bezel panel; said second end of said bilateral fastening means protruding from said bezel panel opposite said first end.

10. An automobile instrument panel assembly according to claim 4 wherein said bilateral fastening means is made of resilient material.

11. An automobile instrument panel assembly according to claim 9 wherein said second end of said generally cylindrical hollow body includes at least one longitudinal slit commencing at the distal end of said body and terminating before or at said bezel panel.

12. An automobile instrument panel assembly according to claim 11 wherein said second end of said generally cylindrical hollow body includes longitudinal slits commencing at the distal end of said body and terminating before or at said bezel panel, wherein said body is divided into portions defined by said slits.

13. An automobile instrument panel assembly according to claim 9 wherein said cylindrical body includes flared portions extending radially from a distal end of said cylindrical body.

14. An automobile instrument panel assembly according to claim 4 wherein said cover panel includes a securing post integrated therein for engagement of said bilateral fastening means.

15. An automobile instrument panel assembly according to claim 14 wherein said securing post comprises a generally cylindrical body having a tapered distal end.

16. An automobile instrument panel assembly according to claim 14 wherein said securing post is made of resilient material.

17. An automobile instrument panel assembly according to claim 14 wherein said securing post includes a collar.

18. An automobile instrument panel assembly comprising;

a bezel panel including bilateral fastening means having a first end and a second end;

a housing, securely fastened to an automobile, said housing having means for connecting said housing to one of said first end and said second end of said bilateral fastening means;

a cover panel including engaging means for connecting said cover panel to said other end of said bilateral fastening means;

wherein engagement of said bilateral fastening means to said housing and said cover panel allows for lateral movement of said housing, bezel panel, and cover panel relative to each other.

19. An automobile instrument panel assembly according to claim 18 wherein lateral movement of said housing, bezel panel, and cover panel relative to each other retains alignment of said instrument panel as a whole.

20. A method for assembling an automobile instrument panel comprising:

providing a housing for containing electronic instrumentation;

attaching a cover panel to said housing via a bezel panel, said bezel having a first side and a second side, said bezel panel including bilateral fastening means for fastening said cover panel to one of said first side and said second side, and the other side of said panel to said bezel housing.

* * * * *